Figure 1:
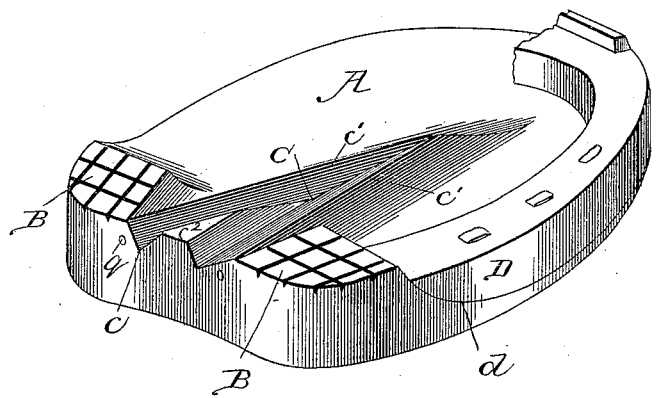

(No Model.)

J. H. DEMPSEY.
HOOF PAD.

No. 345,283.  Patented July 13, 1886.

Witnesses.
W. Rossiter
H. Hallock.

Inventor.
James H. Dempsey
By Paine Fisher
Attys.

UNITED STATES PATENT OFFICE.

JAMES H. DEMPSEY, OF CHICAGO, ILLINOIS.

HOOF-PAD.

SPECIFICATION forming part of Letters Patent No. 345,283, dated July 13, 1886.

Application filed July 11, 1885. Serial No. 171,373. (No model.)

*To all whom it may concern:*

Be it known that I, JAMES H. DEMPSEY, a citizen of the United States, residing at Chicago, in the county of Cook and State of Illinois, have invented certain new and useful Improvements in Foot-Cushions for Horses, of which I do declare the following to be a full, clear, and exact description, reference being had to the accompanying drawings, forming part of this specification.

It is a well-known fact that many of the ordinary foot and leg diseases of horses are directly traceable to the present methods of shoeing. An unshod horse in walking or trotting brings into action not only the hoof, but as well also the heel-quarters and the frog of the foot, the elastic character of which latter particularly enables it to serve as a cushion to save the hoof and body of the foot from severe concussion. The frog in striking upon the ground is somewhat compressed, and being so compressed exerts a slight lateral expansion on the body of the hoof. It is this constant use of the frog that keeps it in healthy state, and the expansion of the hoof, while almost imperceptible, is sufficient, nevertheless, to insure a healthful condition thereof, and to prevent its becoming contracted or from otherwise deteriorating by disuse. Moreover, the surface of the frog of the foot is of such peculiar conformation—that is to say, with grooves and ridges meeting at a point near the center of the foot—that the unshod horse having perfectly healthy feet is much better able to stand upon slippery or inclined surfaces than is the horse with shoes having calks but slightly worn. The iron shoes now generally used lift the feet of the horse above the ground in such manner that the frog of the foot is rendered totally useless. It neither saves the foot from concussion, nor does it exert any action tending to preserve the hoof in healthy condition, or to enable the horse to stand more securely upon slippery or uneven surfaces; but, on the contrary, the hoof is allowed to contract, and the frog, from disuse, frequently becomes diseased and rots away.

My present invention has for its main object to provide an improved foot-cushion for use in conjunction with the iron-shoes for horses, whereby the frog of the foot may be kept in constant and natural action, so that it will preserve the foot in healthy condition; and, as a secondary object, my invention designs to provide an additional safeguard against slipping, that will operate in precisely the same manner as the natural frog of the foot. These objects of invention I have accomplished by providing a foot-cushion of such peculiar construction that when placed with the iron shoe upon the horse's foot the surface exposed will resemble in action the natural foot of the horse, in that there will be a hard rim corresponding with the hoof, elastic heel-calks, and an elastic frog of practically the same extent and conformation as that of the foot.

Figure 2:
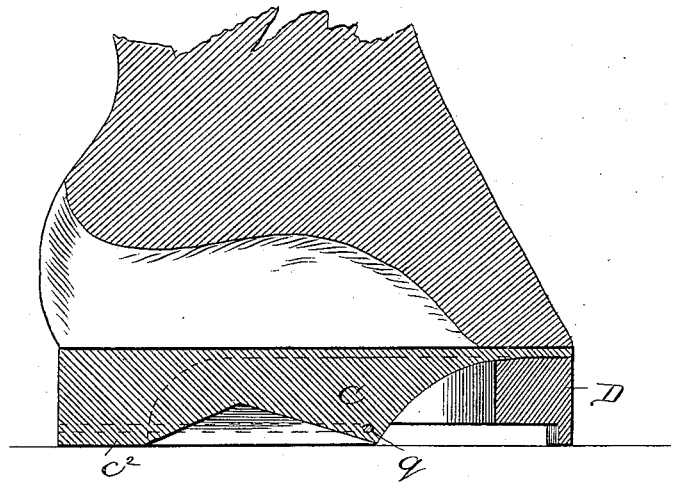

In the accompanying drawings, Figure 1 is a perspective view of the cushion, and of a part of the usual shoe in reverse; Fig. 2, a longitudinal section of the shoe and cushion as applied to the horse's foot.

A designates the body of my improved foot-cushion, which I prefer to form of soft rubber having a stout cloth backing securely cemented thereto. The rear portion of this body is thickened to form the heel-calks B, the outer surface of which is preferably roughened, as shown, and from these heel-calks, and in practically the horizontal plane thereof to a point about the center of the body, extends what I designate the "frog-cushion" C. The surface of this frog cushion is preferably formed with the grooves $c$, beginning at the rear edge and extending obliquely toward the center until they intersect, and by these grooves are formed the ridges $c'$ and the central projecting portion, $c^2$. From the apices of the ridges $c'$, which, as stated, are in substantially the plane of the heel-calks, the frog-cushion is of a thickness gradually decreasing toward that of the main body A, and the heel-calks B are likewise of decreasing thickness. The iron shoe D, having the rear ends, $d$, beveled to correspond with the inclination of the heel-calks, is adapted to fit upon the edge of the main body of the cushion in the manner shown, and with the usual nails, will serve to retain the cushion in firm position on the foot. The thickness of the iron shoe D should be less than that of the heel-calks and frog-cushion, as shown, and said shoe may be furnished with a toe-calk or not, as desired.

From the foregoing description it will be seen that my effort has been to provide the main body of the cushion with a frog-cushion as nearly as possible in imitation of the frog of the horse's foot, and so disposed and of such extent that when the foot is upon the ground the pressure upon the frog-cushion will be immediately communicated to the frog throughout its entire extent in the same way as would happen were the foot unshod. This constant and natural pressure upon the frog not only preserves the frog itself in healthy condition, but by causing it to exert a slight expansive force upon the hoof insures sufficient action thereof to prevent its contracting or becoming otherwise deteriorated. So, also, the pressure upon the elastic heel-calks exerts a corresponding pressure upon the heel-quarters, so that they perform their normal functions and do not suffer from disuse. The grooves and ridges, preferably formed in the surface of the frog-cushion, operate to prevent the slipping of the horse's foot in precisely the same manner as the natural frog performs a like function for the unshod horse, and I have discovered that this arrangement of the frog-cushion in close imitation of the natural frog is the most effective that can be adopted for the purpose.

To strengthen and stiffen the cushion during use, it is preferred to insert a wire, in process of molding, which wire, bent in V form, may advantageously follow the line of the frog-cushion.

I am aware that it has been heretofore proposed to form a hoof-pad of rubber, continuous over the bottom of the foot, the upper face of such pad being of irregular shape to conform to the recesses of the foot, and the lower face being provided with an integral frog; and I am also aware that it has been proposed to form a pad of leather flat upon its upper surface and continuous over the foot-bottom, and having a rubber frog riveted or cemented to its lower face. I am further aware that a foot-pad has been heretofore made in the form of an open rubber ring having a reduced portion to fit between the hoof and a short iron shoe, and having on the back lower face of said ring and integral therewith a thickened central portion and heel-calks. To such constructions therefore I do not wish to be understood as making claim.

Having thus described my invention, what I claim as new, and desire to secure by Letters Patent, is—

1. As a new article of manufacture, a foot-cushion for horses, the same comprising a yielding rubber body flat upon its upper face, continuous over the bottom of the foot, and having upon its under side and integral therewith a frog-cushion conformed to extend beneath and elastically sustain the frog of the foot, and having also thickened heel-calks to elastically sustain the heel-quarters and cause a slight lateral expansion of the foot at such point, and having a reduced portion in front of the heel-calks to receive a short iron shoe, substantially as described.

2. As a new article of manufacture, a foot-cushion for horses, the same comprising a yielding rubber body flat upon its upper surface, continuous over the bottom of the foot, and having upon its under side and integral therewith a frog-cushion conformed to extend beneath and elastically sustain the frog of the foot, and provided upon its lower surface with the deep intersecting grooves extending obliquely toward the center from the rear edge of the cushion, and having also thickened heel-calks to elastically sustain the heel-quarters and cause a slight lateral expansion of the foot at such point, and having a reduced portion in front of the heel-calks to receive a short iron shoe, substantially as described.

JAMES H. DEMPSEY.

Witnesses:
JAMES H. PEIRCE,
GRANVILLE W. BROWNING.